United States Patent [19]
Murai et al.

[11] Patent Number: 5,716,146
[45] Date of Patent: Feb. 10, 1998

[54] RADIAL ROLLING BEARING

[75] Inventors: Takashi Murai; Tatsunobu Momono, both of Kanagawa, Japan

[73] Assignee: NSK Ltd., Tokyo, Japan

[21] Appl. No.: 807,888

[22] Filed: Feb. 26, 1997

[30] Foreign Application Priority Data

Feb. 26, 1996 [JP] Japan ................ 8-038431
May 13, 1996 [JP] Japan ................ 8-117344

[51] Int. Cl.$^6$ .............. F16C 33/46; F16C 33/38; F16C 33/66
[52] U.S. Cl. ............. 384/450; 384/470; 384/523; 384/572
[58] Field of Search ............. 384/470, 523–534, 384/572–580, 450

[56] References Cited

U.S. PATENT DOCUMENTS

| | | | |
|---|---|---|---|
| 553,949 | 9/1896 | Fukuwaka et al. | 384/470 X |
| 3,096,129 | 7/1963 | Hay | 384/470 |
| 5,026,179 | 6/1991 | Ito | 384/523 |
| 5,165,804 | 11/1992 | Fisher et al. | 384/572 X |

*Primary Examiner*—Thomas R. Hannon
*Attorney, Agent, or Firm*—Sughrue, Mion, Zinn, Macpeak & Seas, PLLC

[57] ABSTRACT

In order to reduce the sound pressure levels of abnormal sound called "squeal" and the sound of the cage that are produced during the operation of radial rolling bearings, the radial rolling bearing according to the present invention satisfies the following relations: $1.5 \times 10^{-3} D \leq H \leq 9.0 \times 10^{-3} D$ and $A/B = 0.6$–$1.0$, where D=diameter of the outer peripheral surface of cage $5a$; H=thickness of annular gap 9 between the inner peripheral surface of flange 10 formed at an end portion of outer race $2a$ and the mating outer peripheral surface of the cage $5a$; A=axial length of the outer peripheral surface of an end portion of the cage $5a$; B=axial length of the mating inner peripheral surface of the flange 10.

2 Claims, 6 Drawing Sheets

RADIAL ROLLING BEARING

BACKGROUND OF THE INVENTION

The radial rolling bearing of the present invention may be installed in medium- or large-size electric motors or general machinery such as to support the rotating shafts of these motors and general machinery.

Figure 9:
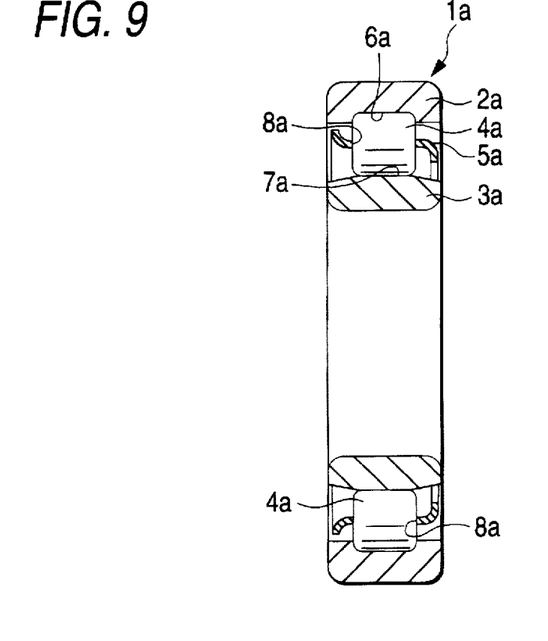
FIG. 9 is a section of the first type of the radial rolling bearing contemplated by the invention.
Figure 10:
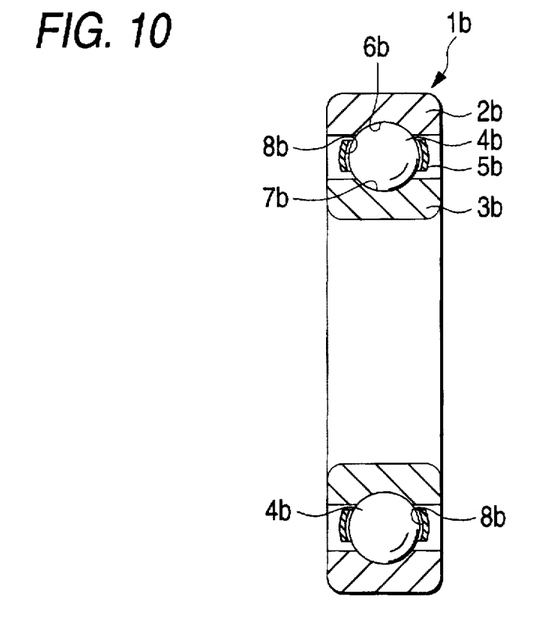
FIG. 10 is a cross section of the second type of the radial rolling bearing contemplated by the invention.

Radial rolling bearings generally indicated by 1a and 1b in FIGS. 9 and 10, respectively, are extensively used to make a part of the support of the rotation of electric motors and other machines. The radial rolling bearing 1a (or 1b) is composed of an outer-race 2a (2b) and an inner race 3a (3b) which are arranged concentrically, a plurality of rolling elements 4a (4b), and a cage 5a (5b) for retaining these rolling elements 4a (4b) in a rotatable manner. An outer raceway 6a (6b) is formed in the axial middle portion of the inner peripheral surface of the outer race 2a (2b) whereas an inner raceway 7a (7b) is formed in the axial middle portion of the outer peripheral surface of the inner race 3a (3b). The plurality of rolling elements 4a (4b) are provided rotatably between the outer raceway 6a (6b) and the inner raceway 7a (7b). The cage 5a (5b) is provided between the inner peripheral surface of the outer race 2a (2b) and the outer peripheral surface of the inner race 3a (3b). The individual rolling elements 4a (4b) are retained rotatably within a plurality of pockets 8a (8b) provided at spacings in the circumferential direction of the cage 5a(5b). In the case of the radial rolling bearing 1a (1b) which is contemplated by the invention, a type of structure for guiding the cage 5a (5b) is not delimited in the invention, but the cage 5a (5b) of a so-called "rolling element guided type" in which its radial displacement is limited on account of the engagement between each of the pockets 8a (8b) and the rolling elements 4a (4b) in it, or the cage 5a (5b) of a so-called "outer race guided type" in which its radial displacement is limited by the outer race 2a (2b), is preferable.

The structural design shown-in FIG. 9 is a radial cylindrical roller bearing which uses cylindrical rollers as rolling elements 4a and accordingly both the outer raceway 6a and the inner raceway 7a are made of cylindrical surfaces.

The structural design shown in FIG. 10 is a radial ball bearing which uses balls as rolling elements 4b and accordingly both the outer raceway 6b and the inner raceway 7b are recessed in a sectorial cross-sectional shape. The cage 5a containing the pockets 8a and the cage 5b containing the pockets 8b are also adapted to have different shapes in accordance with the shape of the rolling elements 4a (4b). During service of the radial rolling bearing 1a (1b), a lubricant such as grease is packed in the areas where the rolling elements 4a (4b) are installed i.e., between the inner peripheral surface of the outer race 2a (or 2b) and the outer peripheral surface of the inner race 3a (3b) such that the area of contact between the rolling surface of each rolling element 4a (4b) and the outer raceway 6a (6b) or the inner raceway 7a (7b) is lubricated effectively.

When an electric motor having the radial rolling bearing 1a (1b) installed in the support of the rotating shaft is operated with only a radial load being applied to the rotating shaft such that the inner race 3a (3b) is rotated at high speed together with the rotating shaft, abnormal sound called "squeal" is often heard. This is a metallic "Jarring" (abrading) sound and should-be avoided in practice since not only does it have a higher sound pressure level than the sound such as racing sound which will be produced unavoidably during the operation of rolling bearings but also it is annoying to the ear. It is generally held that the abnormal sound or "squeal" occurs between the outer race 2a (2b) and each rolling element 4a (4b) due to poor lubrication.

This point is further discussed below. The rotating shafts of electric motors and other rotary machines are in most cases installed in a horizontal direction. When this horizontal rotating shaft is supported with the radial rolling bearing 1a (1b), the rolling elements 4a (4b) in the lower half of the bearing which is a "loaded zone" are constrained between the outer raceway 6a (6b) and the inner raceway 7a (7b) to make normal rolling movements by revolving about the rotating shaft while rotating on their own axis. On the other hand, the rolling elements 4a (4b) in the upper half of the bearing which is an "unloaded zone" are not constrained between the outer raceway 6a (6b) and the inner raceway 7a (7b) so they will rotate on their own axis with difficulty. As a result, the rolling surface of the elements 4a (4b) will abrade against the outer raceway 6a (6b) and the inner raceway 7a (7b) and this phenomenon generally called "revolution slip" will cause the abnormal sound or "squeal". In addition, more heat is generated within the radial rolling bearing 1a (1b) to potentially deteriorate its performance.

In order to prevent the generation of abnormal sounds which occur for the reasons set forth above, the following three measures have heretofore been taken:

(1) the operating gap in the radial rolling bearing 1a (1b) is reduced; the internal gap of the radial rolling bearing 1a (1b) is set at the smallest possible level in full consideration of the temperature rise during steady-state operation, thereby encouraging the rolling elements 4a (4b) in the "unloaded zone" to effectively rotate on their own axis;

(2) the radial rolling bearing 1b is pressurized in a thrust direction; if the radial rolling bearing 1b which uses balls as rolling elements 4b is pressurized in a thrust direction, the rolling elements in the "unloaded zone" are encouraged to effectively rotate on their own axis;

(3) shallow grooves extending in the peripheral direction are formed in the outer raceway 6a or on the rolling surfaces of elements 4a of the radial rolling bearing 1a (Examined Japanese Patent Publication Sho 44-15689 and Examined Japanese Utility Model Publication Sho 49-40208); the grooves permit a lubricant to be provided between the outer raceway 6a and the rolling surface of each element 4a, thereby preventing the occurrence of the abnormal sound.

Among the three conventional measures just described above, the first approach is not only incapable of achieving completely satisfactory results but it also involves another limitation in that abnormal heat generation or seizure will occur if the operating gap is unduly small.

The second approach is applicable to the radial ball bearing shown in FIG. 10 but not applicable to the radial cylindrical bearing shown in FIG. 9. As a further problem, even the radial ball bearing cannot be pressurized depending upon the structural design of the support of the rotation of rotary machines. For these reasons, the second approach is by no means a completely effective measure.

The third approach provides completely satisfactory results if it is applied to cylindrical roll bearings but, on the other hand, it involves cumbersome operations to form grooves and this results in a higher cost. As a further problem, the third approach is not applicable to medial ball bearings.

SUMMARY OF THE INVENTION

It is an object of the present invention to provide a radial rolling element which has been developed with a view to solving all of these problems in the prior art.

The object of the present invention can be achieved by a radial rolling bearing comprising an outer race having an outer raceway in the axial middle portion of the inner peripheral surface, an inner race having an inner raceway in the axial middle portion of the outer peripheral surface, a plurality of rolling elements provided rotatably between said outer raceway and said inner raceway, and a cage that is provided between the inner peripheral surface of said outer race and the outer peripheral surface of said inner race and which retains said plurality of rolling elements rotatably within a plurality of pockets provided at spacings in the circumferential direction, the improvement wherein said radial rolling bearing satisfies the following relations: $1.5 \times 10^{-3} D \leq H \leq 9.0 \times 10^{-3} D$ and $A/B = 0.6-1.0$, where D=diameter of the cage's peripheral surface which is either the inner or outer peripheral surface in an axial end portion of said cage; H=thickness of the annular gap between said cage's peripheral surface and the a race ring's peripheral surface which is either the inner peripheral surface of an axial end portion of said outer race or the outer peripheral surface of an axial end portion of said inner race under the condition that the cage, the inner race and the outer race are disposed coaxially; A=axial length of said cage's peripheral surface; B=axial length of said race ring's peripheral surface.

When the concept of the invention is to be applied to radial cylindrical roller bearings, the rolling surfaces of cylindrical rollers used as the rolling elements are preferably not crowned but rendered straight in shape.

In the specification "crowning or crowned" means a machining process for machining the cylindrical roller into a specific configuration in which the generatrix of the rolling surfaces of the cylindrical roller at the both ends is made smaller in the outer diameter than the cylindrical roller at the center portion in the axial direction thereof so as to prevent contact stress occurred among the both axial ends of the cylindrical roller, the inner race and the outer race from being increased and also to distribute uniformly the stress into the rolling surface of the cylindrical roller in the axial direction as much as possible.

Figure 8:
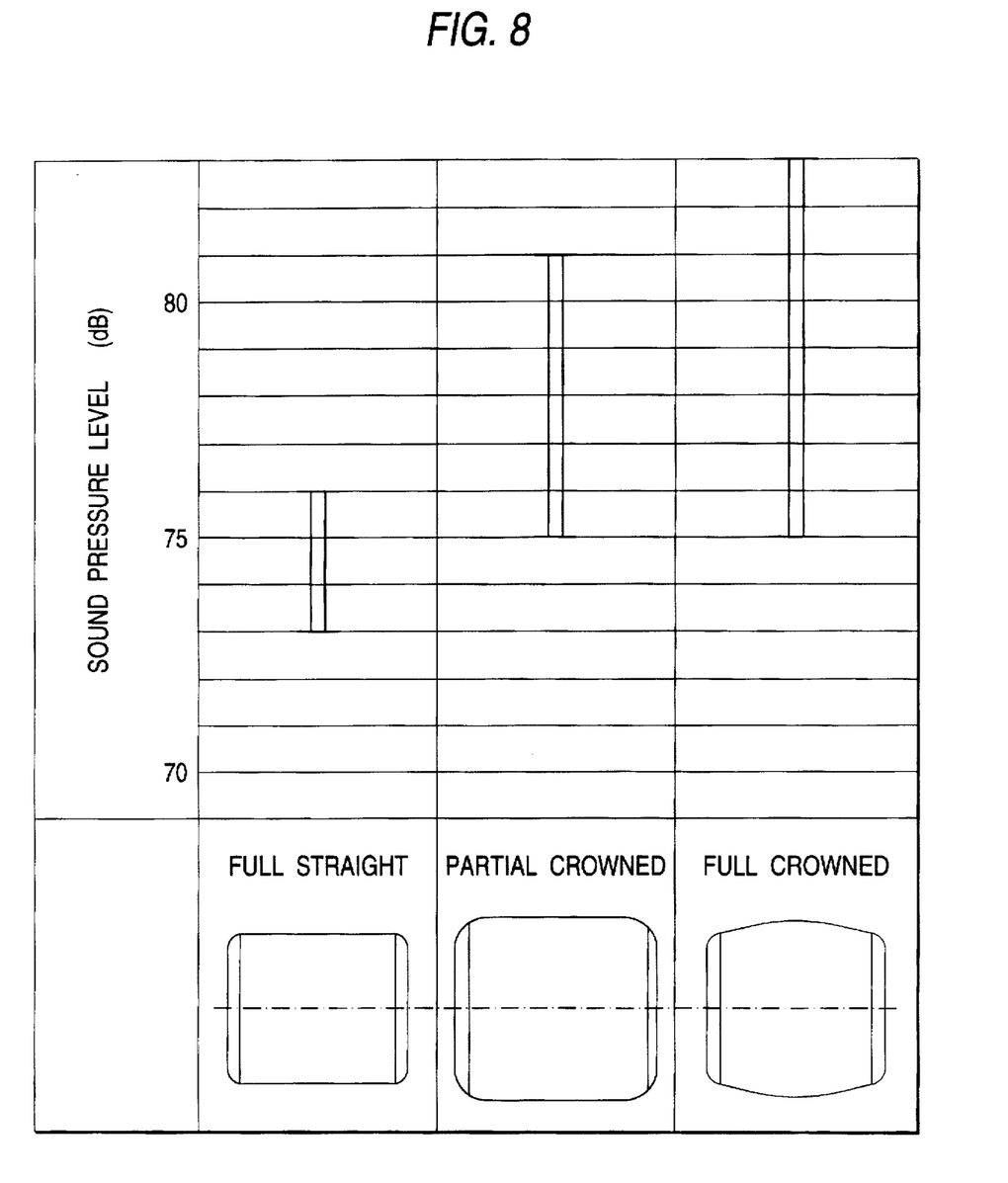
FIG. 8 is a graph showing the result of the fifth experiment which was conducted in order to investigate as to how the geometry of the rolling surfaces of cylindrical rollers affected the generation of "squeals"

A type of the "crowning" process can be roughly divided into two types, one of which is called as "a full crowning type" and the other of which is called as "a partial crowning type" generally, as shown in the illustrations of FIG. 8. A rolling element of the full crowned type has a configuration in which a generatrix of the rolling surface in the axial direction is made of a single arc shape, and a rolling element of the partial crowned type has a configuration in which a generatrix of the rolling surface in the axial direction is constituted by an axial center portion straightly extended in parallel with the axis of the roller and inclined end portions in the axial direction each connected smoothly to the axial center portion and defined by a straight line or a curved line.

A crowning process is given-as a finishing process with a centerless grinder because a machined amount is very small as compared with the diameter of the cylindrical roller.

DETAILED DESCRIPTION OF THE PREFERRED EMBODIMENT

The radial rolling bearing of the invention which has the structural design described in the preceding paragraphs in such that the lubricant in the annular gap between the cage's peripheral surface and the race ring's peripheral surface develops an attenuating force that restrains the movement of the rolling elements in the "unloaded zone" of the bearing via the cage. Stated more specifically, the thickness of the annular gap H and the diameter of the cage's peripheral surface D are so determined as to satisfy the relation $1.5 \times 10^{-3} D \leq H \leq 9.0 \times 10^{-3} D$ and the axial length of the cage's peripheral surface A is adjusted to be 60% to 100% of the axial length of the race ring's peripheral surface B; as a result, the resistance against the flow of the lubricant which is passing through the annular gap is sufficiently increased to prevent easy displacement of the cage. This offers the advantage that even if the rolling elements in the "unloaded zone" experience abnormal movements (i.e., revolution about the rotating shaft without rotation on their own axis, as well as radial displacements), the cage will not be displaced by the movement of the rolling elements. In addition, in the case where the cage is "rolling element guided" type, the cage will regulate the movement of the rolling elements and vice versa. Stated more specifically, the cage is limited in radial displacement on account of the engagement between each of the pockets and the rotating element in it and a lubricant such as grease is packed between each of the pockets and the rotating element in it. Accordingly, if the thickness of the annular gap H is regulated to regulate the movement of the cage, the movement of the rolling elements retained in the cage is also regulated. As a result, the occurrence of abnormal sounds called "squeals" can be prevented.

Preferably, the radial rolling bearing of the invention is a radial cylindrical roller bearing and the rolling surfaces of cylindrical rollers used as the rolling elements are not crowned but rendered straight in shape. In this case, the rolling elements are sufficiently stabilized in motion to achieve a further reduction in the occurrence of the abnormal sound.

In the present invention, the thickness of the annular gap H and the diameter of the cage's peripheral surface D are so determined as to satisfy the relation $1.5 \times 10^{-3} D \leq H \leq 9.0 \times 10^{-3} D$ and the axial length of the cage's peripheral surface A is adjusted to be 60 to 100% of the axial length of the race ring's peripheral surface B. The reasons for these numerical limitations are as follows.

First of all, if the thickness of the annular gap H is less than $1.5 \times 10^{-3} D$, it is difficult to ensure that a sufficient amount of lubricant is packed in the annular gap and this can be a potential cause of abnormal wear and temperature rise. If the annular gap thickness H exceeds $9.0 \times 10^{-3}D$, the resistance against the flow of the lubricant passing through the annular gap is reduced to such a small level that the occurrence of the abnormal sound cannot be fully prevented. Therefore, the annular gap thickness H is regulated to lie within the range from $1.5 \times 10^{-3}D$ to $9.0 \times 10^{-3}D$. If there are more factors to be considered such as the generation of heat during machine operation, the annular gap H is preferably regulated to satisfy the relation $4.5 \times 10^{-3}D < H < 7.5 \times 10^{-3}D$.

If the axial length of the cage's peripheral surface A is less than $0.6 \times B$, the resistance to the flow of the lubricant passing through the annular gap is reduced to such a small level that the occurrence of the abnormal sound cannot be fully prevented. On the other hand, if the axial length of the cage's peripheral surface A exceeds $1.0 \times B$, part of the cage will protrude to come nearer the outer or inner raceway than it should normally be or, alternatively, part of the cage protrudes beyond either axial end face of the outer or inner race. Such partial protrusion of the cage is by no means preferred from design viewpoint of the radial rolling bearing. Stated specifically, the cage must be prevented from partly protruding to come nearer the outer or inner raceway than it should normally be in order to ensure that the contact between the rolling surface of each rolling element and the outer or inner raceway is regulated to be in the normal state. On the other hand, the cage must be prevented from partly protruding beyond either axial end face of the outer or inner race in order to ensure that the cage will not interfere with other members than the bearing. With all these factors taken into consideration, the axial length of the cage's peripheral surface A is specified to range from 60% to 100% of the axial length of the race ring's peripheral surface B.

If the concept of the present invention is to be applied to a radial cylindrical rolling bearing, the rolling surfaces of the cylindrical rollers used as rolling elements are preferably not crowned but rendered straight in shape. In order to know what shape should best be assumed by the rolling surfaces, the present inventors provided three kinds of shape, a full crowned shape which was crowned over the full axial length of the outer peripheral surface, a partial crowned shape which was crowned only in the areas near the two axial end portions, and a full straight shape which was not crowned in any part of the rolling surface. Using these samples, the inventors compared the effects of the respective shapes on the occurrence of "squeals" and found that the radial cylindrical roller bearing incorporating the cylindrical rollers of a full straight shape produced "squeals" less frequently than the radial cylindrical roller bearings incorporating the cylindrical rollers of the other two shapes. It was also found that the "squeals" generated from the radial cylindrical roller bearing incorporating the cylindrical rollers of a full straight shape had lower sound pressure levels. On the other hand, the radial cylindrical roller bearings incorporating the cylindrical rollers of a partial crowned shape and a full crowned shape produced "squeals" more frequently and their sound pressure levels were higher than in the case of the radial cylindrical roller bearing incorporating the cylindrical rollers of a full straight shape. It should also be noted that the radial cylindrical roller bearings incorporating the crowned cylindrical rollers produced greatly varying and, hence, instable sound pressure levels during "squealing". Thus, the radial cylindrical roller bearings incorporating the cylindrical rollers crowned in the rolling surfaces had a tendency to "squeal" more easily than the radial cylindrical roller bearing incorporating the cylindrical rollers that were full straight in the shape of the rolling surfaces and this would be because the cylindrical rollers crowned in the rolling surfaces had such a short length of contact between the generating line for each rolling surface and the outer or inner raceway that the rollers were prone to make instable motions.

Embodiments according to the present invention will be explained hereinafter.

Figure 1:
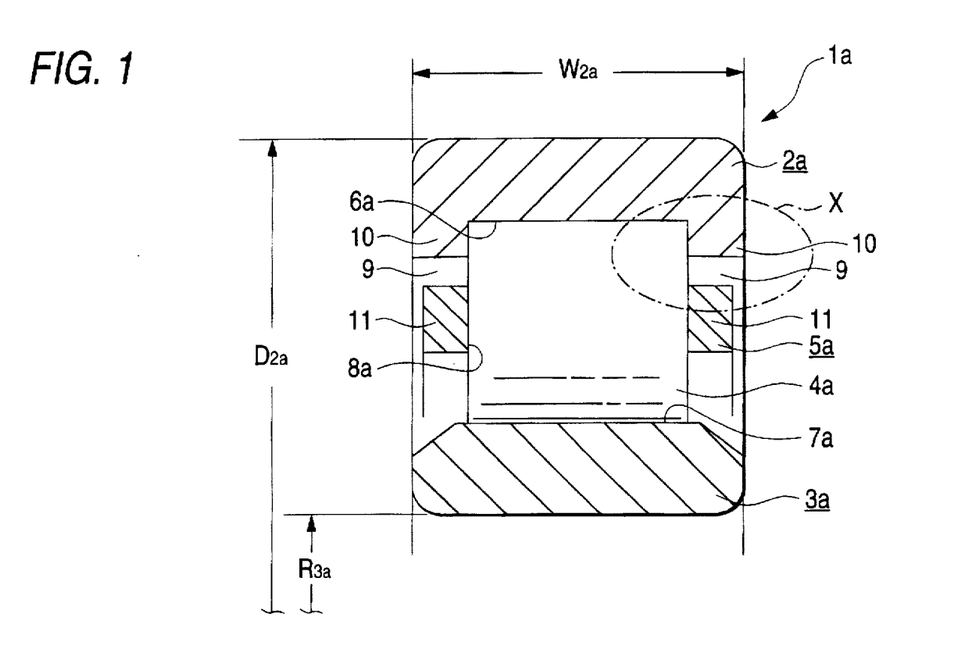
FIG. 1 is a partial section of the rolling bearing used in the first experiment which was conducted in order to verify the effectiveness of the present invention.
Figure 2:
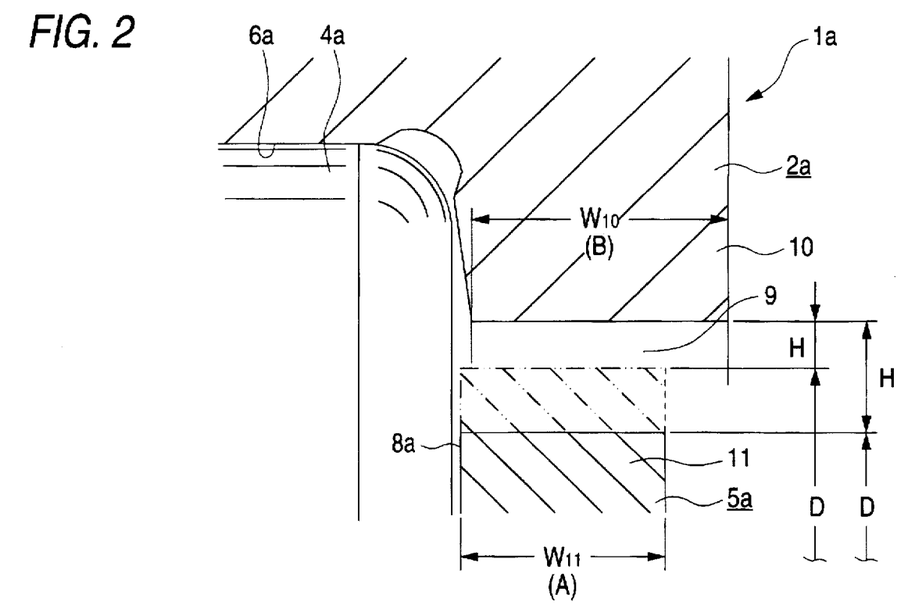
FIG. 2 shows enlarged the portion X of FIG. 1.

We now describe the experiments conducted in order to verify the effectiveness of the invention. The first experiment was conducted with a radial rolling bearing of the type indicated by $1a$ in FIGS. 1 and 2 in order to investigate how H, or the thickness of the gap 9 between the outer peripheral surface of either axial (to either right or left of FIGS. 1 and 2) end portion of the cage $5a$ and the inner peripheral surface of the mating end portion of the outer race $2a$, would affect the sound pressure level of the abnormal sound called "squeal". All samples of the radial rolling bearing $1a$ used in the first experiment were radial cylindrical roller bearings designated an "NU type" with the following dimensions: the outer race $2a$ had an outside diameter $D_{2a}$ of 160 mm and a width $W_{2a}$ of 30 mm whereas the inner race $3a$ had an inside diameter $R_{3a}$ of 90 mm. A pair of flanges 10 were formed on the inner peripheral surfaces of the two axial end portions of the outer race $2a$ in the radial rolling bearing $1a$. Each flange had a width $W_{10}$ of 5 mm. The above-mentioned gap 9 was formed between the inner peripheral surface of either flange 10 and the outer peripheral surface of mating axial end portion of the cage $5a$. Hence, the inner peripheral surface of each flange 10 corresponds to the "race ring's peripheral surface" mentioned in claim 1 and the width of each flange 10 which is designated by $W_{10}$ corresponds to the "axial length of the race ring's peripheral surface B" also mentioned in claim 1. In addition, the outer peripheral surface of a rim 11 provided in either axial end portion of the cage $5a$ corresponds to the "cage's peripheral surface" mentioned in claim 1 and the width of the rim 11 which is designated by $W_{11}$ corresponds to the "axial length of the cage's peripheral surface A" also mentioned in claim 1. The outside diameter of the rim 11 corresponds to the "diameter of the cage's peripheral surface D" mentioned in claim 1. In the first experiment, each flange 10 had a width $W_{10}$ of 5 mm and each rim 11 had a width $W_{11}$ of 2.75 mm. Therefore, A/B ($=W_{11}/W_{10}$) was 0.55. Cylindrical rollers $4a$ were used as the rolling elements and their rolling surfaces were not crowned at all but rendered full straight in shape.

In the experiment, 15 samples were provided such that the value of H, or the thickness of the gap 9, was varied in an increment of $1 \times 10^{31}$ $^3$D over the range of $1-15 \times 10^{31}$ $^3$D and the sound pressure level of the "squeal" occurring during the rotation of the inner race $3a$ was measured. Three samples were provided to represent the same value of H and, hence, a total of 45 samples were employed in the first experiment, which was performed under the following conditions:

Rotational speed: 1,200 rpm

Lubricant: grease

Radial load: 150 kgf

Frequency at which sound 3,500 to 4,500 Hz (principal pressure measurements were component of "squeals") made Material of outer race $2a$: SUJ2

Material of cage $5a$: nylon 66 containing 25 wt % glass fibers

Figure 3:
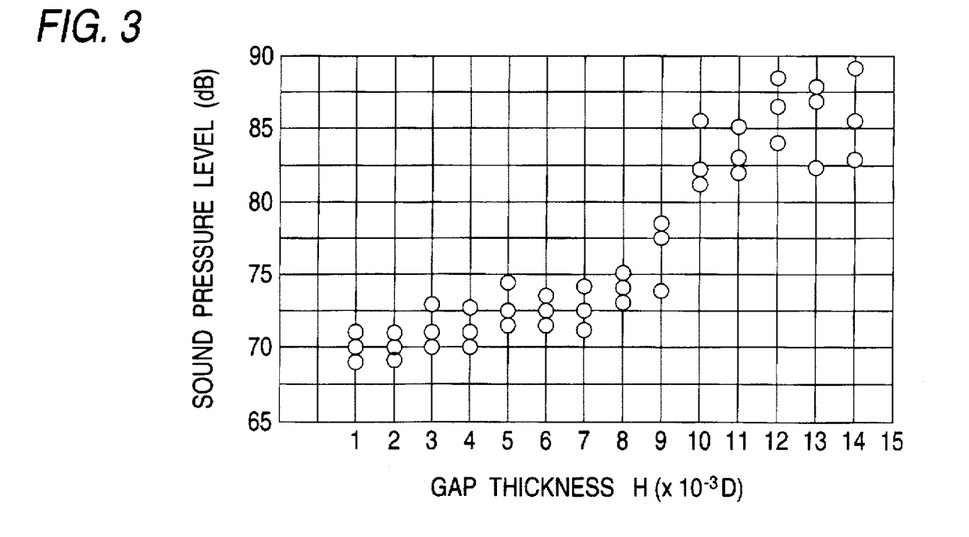
FIG. 3 is a graph showing the result of the first experiment.

FIG. 3 shows the result of the first experiment which was performed under the conditions set forth above. The horizontal axis of the graph in FIG. 3 plots the annular gap thickness H and the vertical axis plots the sound pressure level of the "squeal" produced during the experiment. The relationship between the gap thickness H and the sound pressure level is represented by an open circle for each sample.

As one can see from FIG. 3, the sound pressure level of "squeal" decreased with decreasing gap thickness H and at H values of $9.0 \times 10^{-3}$D and below, the sound pressure level of "squeal" dropped markedly, with a corresponding decrease in data scattering between samples. These facts show that in order to dampen the "squeal" satisfactorily, the annular gap H is preferably regulated to $9.0 \times 10^{-3}$D and below.

If the annular gap thickness H is regulated to $9.0 \times 10^{-3}$D and below, the grease that is pushed out from within the radial rolling bearing 1a as the result of rotation of the inner race 3a and the rolling elements 4a will experience an increased resistance against its passage through the gaps 9, whereupon the bearing 1a becomes better adapted to retain the grease in its interior and, at the same time, the grease in the gaps 9 will have improved viscosity damping characteristics. As a result, the mechanism already described above works to control the abnormal movements of the rolling elements 4a in the "unloaded zone", thereby suppressing the "squeal".

It should be noted that the lower limit of the annular gap thickness H is determined not from the viewpoint of "squeal" suppression but for the purpose of securing the intended functions of the radial rolling bearing 1a. If the gap thickness H is unduly small, there will no longer be a sufficient amount of a lubricant layer present in the annular gaps 9, thereby increasing the possibility that the inner peripheral surface of either flange 10 will abrade directly with the outer peripheral surface of the mating axial end portion of the cage 5a. If these peripheral surfaces abrade directly with each other, not only the resistance to the rotation of the radial rolling bearing 1a but also the chance of abnormal wear and seizure will be increased. In the first experiment described above, the two peripheral surfaces partly experienced abnormal wear when the annular gap thickness H was $1 \times 10^{-3}$D. Therefore, the lower limit of the annular gap thickness H was specified to be at $1.5 \times 10^{-3}$D.

Figure 4:
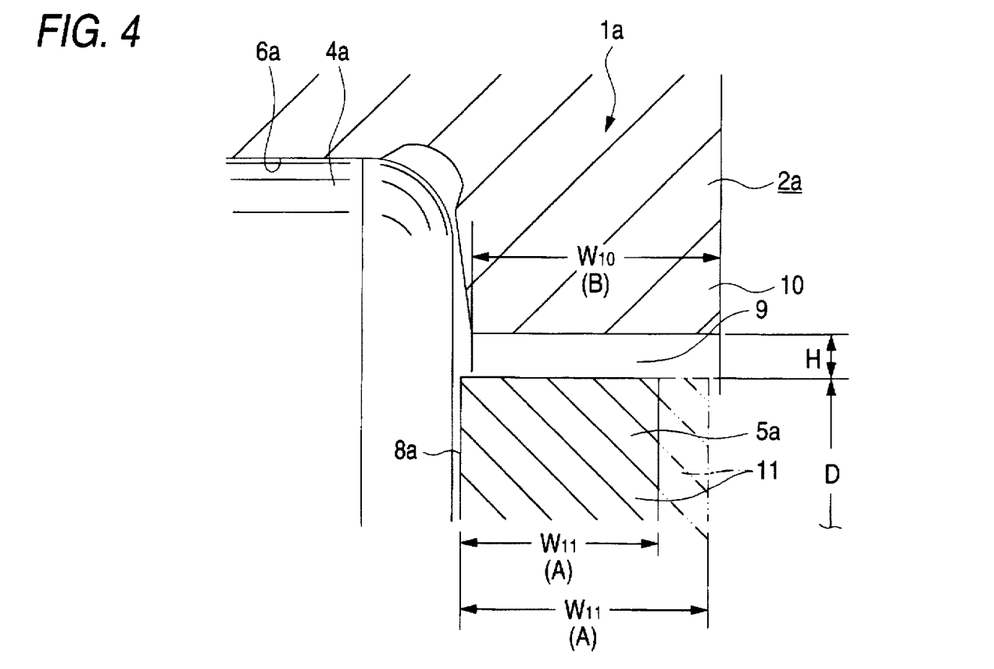
FIG. 4 is an enlarged partial section of the rolling bearing used in the second experiment which was conducted in order to verify the effectiveness of the invention.
Figure 5:
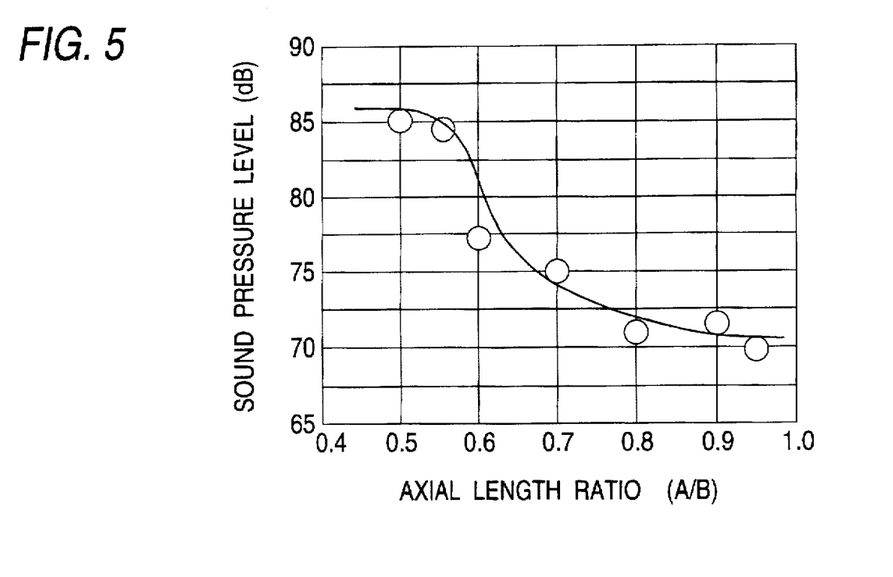
FIG. 5 is a graph showing the result of the second experiment.

The second experiment was conducted with a radial rolling bearing of the type indicated by 1a in FIG. 4 in order to investigate how the ratio of A to B ($A/B = W_{11}/W_{10}$) would affect the sound pressure level of "squeal"; A, or the axial length of the cage's peripheral surface, is equal to $W_{11}$ which is the width of rim 11 provided at either axial (to either right or left of FIG. 4) end portion of the cage 5a, and B which is the axial length of the race ring's peripheral surface is equal to $W_{10}$ which is the width of flange 10. The thickness, H, of the annular gap 9 formed between the outer peripheral surface of either axial end portion of the cage 5a and the inner peripheral surface of the mating axial end portion of the outer race 2a was fixed at $2.2 \times 10^{-3}$D. In the experiment, A/B, or the ratio between the two axial lengths, was varied at seven values of 0.5, 0.55, 0.6, 0.7, 0.8, 0.9 and 0.95 and the sound pressure level of the "squeal" produced by each of the seven samples was measured. The results are shown in FIG. 5. The rims 11 and flanges 10 were chamfered along both end edges and the chamfering radius of curvature was minimized (the edges were angulated) so as to increase the effective widths of the rims 11 and flanges 10.

As one can see from FIG. 5, the sound pressure level of "squeal" decreased with increasing A/B and when A/B increased to 0.6, the sound pressure level of the "squeal" dropped markedly. As in the first experiment, the rolling elements 4a used in the second experiment were cylindrical rollers of which the rolling surfaces were full straight in shape.

The third experiment was conducted with both the annular gap thickness H and the axial length ratio A/B being varied, and their effects on the sound pressure level of "squeal" were investigated. Part of the results of this experiment are shown in Table 1 and the ranges of both H (the thickness of annular gap 9) and A/B (A=axial length of the cage's peripheral surface; B=axial length of the race ring's peripheral surface) that could reduce the sound pressure level of "squeal" are indicated in FIG. 6.

TABLE 1

| H ($\times 10^{-3}$D) | A/B | | |
|---|---|---|---|
| | 0.6 | 0.75 | 0.95 |
| 1.5 | 72–73 (dB) | 71–72 (dB) | 68–70 (dB) |
| 6.0 | 72–74 (dB) | 72–73 (dB) | 70–72 (dB) |
| 9.0 | 74–76 (dB) | 72–74 (dB) | 72–74 (dB) |

Figure 6:
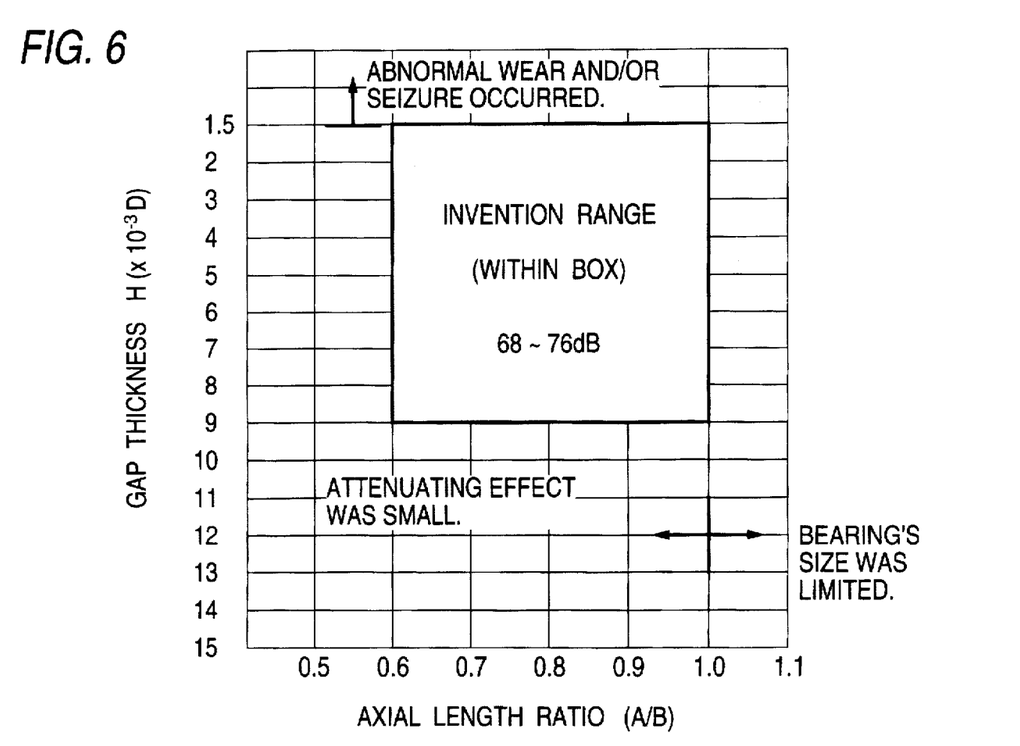
FIG. 6 is a graph showing the applicable range of the invention based on the results of the first to the third experiment.

The horizontal axis of the graph in FIG. 6 plots A/B (A=axial length of the cage's peripheral surface; B=axial length of the race ring's peripheral surface) and the vertical axis plots H (thickness of gap 9). The area within the rectangle defined by a thick solid line is within the scope of the invention. In areas above this rectangle, defects such as abnormal wear and seizure are prone to occur, and in areas to the right of the rectangle, the cage has an increased chance of interfering with members other than the bearing. In areas below and to the left of the rectangle, the sound pressure level of "squeal" cannot be adequately reduced.

Figure 7:
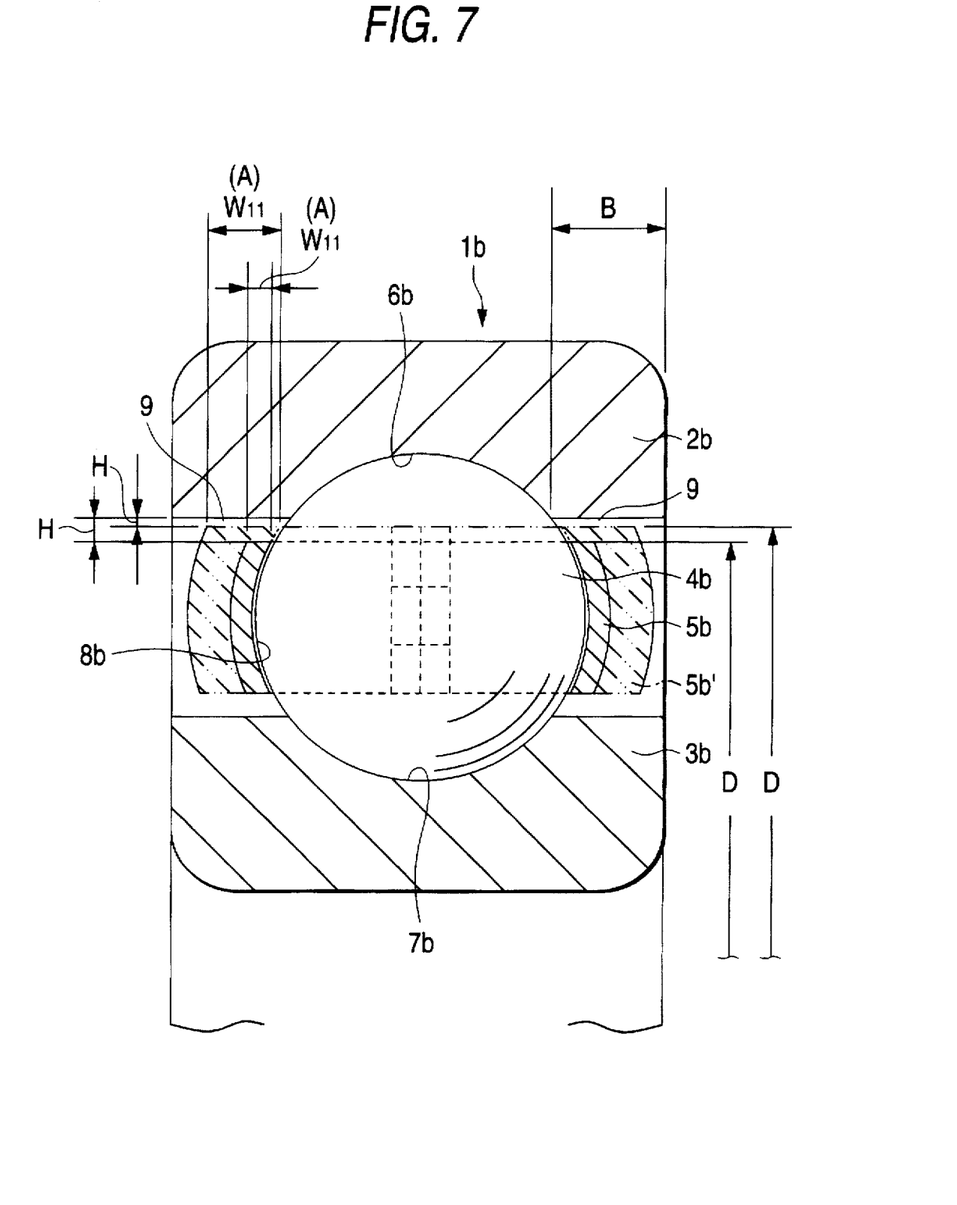
FIG. 7 is a partial section of the rolling bearing used in the fourth experiment which was conducted in order to verify the effectiveness of the invention.

FIG. 7 shows the radial rolling bearing 1b which was used in the fourth experiment conducted in order to verify that the concept of the present invention was applicable not only to radial cylindrical roller bearings but also to radial ball bearings. In the fourth experiment, the sound pressure level of the "squeal" produced from a prior art radial rolling bearing 1b incorporating the cage 5b indicated by a solid line in FIG. 7 was compared with the sound pressure level of the "squeal" produced from the invention product incorporating the cage 5b' indicated by a two-short-and-one-long dashed line.

The value of H, or the thickness of annular gap 9 formed between the outer peripheral surface of either axial (either to the right or left of FIG. 7) end portion of cage 5b or 5b' and the inner peripheral surface of the mating axial end portion of outer race 2b was adjusted to $1.8 \times 10^{-2}$D in the prior art product (D=outside diameter of the cage 5b) and to $0.6 \times 10^{-2}$D in the invention product (A=outside diameter of the cage 5b'). The value of A/B (A=axial length of the cage's peripheral surface; B=axial length of the race ring's peripheral surface) was adjusted to 0.4 in the prior art product and 0.75 in the invention product. Sound pressure level measurements conducted under these conditions revealed that as in the case of the radial roller bearing, the radial ball bearing of the invention could reduce the sound pressure level of "squeal" compared to the prior art version.

FIG. 8 shows the results of the fifth experiment conducted in order to investigate how the shape of the rolling surfaces of cylindrical rollers used as the rolling elements would affect the generation of "squeals". In order to highlight the effect of the geometry of the rolling surfaces on the generation of "squeals", the annular gap thickness H and the axial length ratio A/B were deliberately set as $H=20 \times 10^{-3}$D and A/B=0.3, which were outside the ranges of the invention. Except for the shape of the rolling surfaces of the cylindrical rollers, the samples used in the fifth experiment were identical in all aspects including the shapes of the inner race, outer race and cage. The sound pressure level of the "squeal" produced during the operation of the radial cylindrical roller bearing was measured for three cases of the shape of rolling surfaces, i.e., full crowned, partial crowned and full straight.

The results of the fifth experiment conducted in this way are shown in FIG. 8, from which one can see that when using the cylindrical rollers of which the rolling surfaces were full straight in shape, the generation of "squeals" could be suppressed and, in addition, the sound pressure level of the "squeals" produced was stable with the scattering being as small as 2 to 3 dB. In contrast, the radial cylindrical roller bearing incorporating cylindrical rollers of which the rolling surfaces were partial crowned, as well as the radial cylindrical roller bearing incorporating cylindrical rollers of which the rolling surfaces were full crowned produced frequent "squeals" and, in addition, the sound levels of the "squeals" produced were about 3 to 5 dB higher than that of the "squeals" produced form the radial cylindrical roller bearing incorporating cylindrical rollers of which the rolling surfaces were full straight in shape. What is more, the scattering of the sound pressure levels of the "squeals" produced were as great as 5 to 8 dB. The reason why the radial cylindrical roller bearings incorporating the crowned cylindrical rollers had a greater tendency to produce "squeals" than the radial cylindrical roller bearing incorporating the full straight cylindrical rollers would be that the crowned cylindrical rollers are characterized by such a short length of contact between the rolling surface generating line and each of the outer and inner raceways that the cylindrical rollers have- an increased potential to experience unstable movements.

In the experiment the results of which are shown in FIG. 8, the annular gap thickness H and the axial length ratio A/B were deliberately adjusted to take on values outside the scope of the invention in order to evaluate the effects of crowing the rolling surfaces of the cylindrical rollers. It has been verified that even if H and A/B are outside the scope of the invention, rendering the rolling surfaces of the cylindrical rollers straight in shape is effective in attenuating the "squeal". It should, however, be emphasized that the heart of the present invention lies in specifying the values of H and A/B to be within the ranges set forth hereinabove. The shape of the rolling elements is no more than an ancillary limiting factor. Using cylindrical rollers as the rolling elements and rendering their rolling surfaces straight in shape is a technique which, when combined with the concept of the invention, will prove effective in further suppressing the generation of "squeals".

In addition, although the aforementioned explanation was given to the embodiments according to the present invention in which the outer peripheral surface of the cage at the axial end portion and the inner peripheral surface of the outer race at the axial end portion are respectively selected and explained as a cage's peripheral surface and a race ring's peripheral surface, the present invention is applicable not only to such embodiments but also a construction in which the inner peripheral surface of the cage at the axial end portion and the outer peripheral surface of the inner race at the axial end portion are respectively selected as a cage's peripheral surface and a race ring's peripheral surface. For example, the present invention is applicable to a radial cylindrical roller bearing so called as a N-type in which a pair of flange portions are provided at the inner race thereof. In this case, D=diameter of the cage's peripheral surface which is the inner peripheral surface in an axial end portion of the cage; H=thickness of the annular gap between the inner peripheral surface of the cage and the flange portions of the inner race under the condition that the cage and the inner race are coaxially disposed; A=axial length of inner peripheral surface of the rim portion of the cage; and B=axial length of one of the flange portions of the inner race. Further, in this radial rolling bearing also satisfies the following relations:

$$1.5 \times 10^{-3} D \leq H \leq 9.0 \times 10^{-3} D \text{ and } A/B = 0.6-1.0.$$

Having the structural and operational features described above, the radial rolling bearing of the present invention is capable of attenuating the abnormal sound that will be heard if a horizontally placed rotating shaft is supported by the bearing and when only a radial load is applied to the shaft. The feregoing description only concerns the effectiveness of the invention in attenuating "squeals"but it goes without saying that the invention is also capable of suppressing the sound of the cage itself.

What is claimed is:

1. A radial rolling bearing comprising:

an outer race having an outer raceway in the axial middle portion of the inner peripheral surface;

an inner race having an inner raceway in the axial middle portion of the outer peripheral surface;

a plurality of rolling elements provided rotatably between said outer raceway and said inner raceway; and a cage provided between the inner peripheral surface of said outer race and the outer peripheral surface of said inner race and having a plurality of pockets for retaining and accommodating said plurality of rolling elements rotatably, said pockets being provided at spacings in the circumferential direction, wherein said radial rolling bearing satisfies the following relations:

$$1.5 \times 10^{-3} D \leq H \leq 9.0 \times 10^{-3} D \text{ and } A/B = 0.6-1.0,$$

where D=diameter of the cage's peripheral surface which is either the inner or outer peripheral surface in an axial end portion of said cage; H=thickness of the annular gap between said cage's peripheral surface and a race ring's peripheral surface which is either the inner peripheral surface of an axial end portion of said outer race or the outer peripheral surface of anxial end portion of said inner race; A=axial length of said cage's peripheral surface; B= axial length of said race ring's peripheral surface.

2. A radial rolling bearing according to claim 1, in which each of said rolling elements is shaped in the form of a cylindrical roller, and the rolling surface of said cylindrical roller is rendered straight in shape.

* * * * *